(12) United States Patent
Vignocchi et al.

(10) Patent No.: US 6,260,832 B1
(45) Date of Patent: Jul. 17, 2001

(54) SHOCK ABSORBER WITH ADJUSTABLE COMPRESSION AND REBOUND

(75) Inventors: Loris Vignocchi, Zola Predosa; Sandro Musiani, Marzabotto, both of (IT)

(73) Assignee: Marzocchi S.p.A., Bologna (IT)

( * ) Notice: Subject to any disclaimer, the term of this patent is extended or adjusted under 35 U.S.C. 154(b) by 0 days.

(21) Appl. No.: 09/310,700

(22) Filed: May 7, 1999

Related U.S. Application Data

(63) Continuation-in-part of application No. 08/992,752, filed on Dec. 17, 1997, now Pat. No. 6,042,091.

(51) Int. Cl.[7] .................... F16F 9/48; F16F 9/14; B60G 17/08; B62K 25/08
(52) U.S. Cl. .................. 267/64.15; 267/226; 188/319.2; 188/322.13; 188/282.9; 188/316; 188/322.15; 188/322.22; 188/282.5; 280/275
(58) Field of Search .................... 267/64.15, 64.26, 267/221, 218, 131, 226; 188/319.1, 319.2, 282.5, 299.1, 269, 285, 281, 316, 282.9, 322.19, 318, 317, 322.15, 322.22, 314–315, 300, 288, 282.6, 322.13; 280/275, 276, 277, 278, 279–284

(56) References Cited

U.S. PATENT DOCUMENTS 5,478,099 * 12/1995 Kawahara ........................ 280/276
5,848,675 * 12/1998 Gonzalez ......................... 188/319.2
6,042,091 * 3/2000 Marzocchi et al. ............... 267/64.15

* cited by examiner

Primary Examiner—Douglas C. Butler
(74) Attorney, Agent, or Firm—Ward & Olivo

(57) ABSTRACT

The present invention relates generally to front suspension fork assemblies for bicycles, and provides an improved suspension fork comprising an adjustable compression system for quick and easy adaptation to various types of terrain. The front suspension fork of the present invention comprises a pair of rigidly connected parallel fork legs, with each fork leg having at its bottom end a dropout for connection to the axle of a wheel. Each fork leg further comprises a shock absorber positioned therein and comprising a helical coil spring to urge expansion of the sliding tubes, flow dampers, and damping fluid within the cavities of the sliding tubes to dampen the movement of the sliding tubes in compression and expansion. Each flow damper comprises a flexible shim which opens in compression or expansion to increase the flow of damping fluid. Varying the flexibility of the shims also varies the damping effect of the shock absorber. The shock absorber also contains a shaft and plug assembly which variably throttles to control the flow of liquid through the upper flow damper. By rotating an external screw, it is possible to adjust the damping response of the shock absorber.

18 Claims, 7 Drawing Sheets

SHOCK ABSORBER WITH ADJUSTABLE COMPRESSION AND REBOUND

CROSS-REFERENCE TO RELATED APPLICATIONS

This application is a continuation-in-part of application Ser. No. 08/992,752, filed Dec. 17, 1997, now U.S. Pat. No. 6,042,091.

TECHNICAL FIELD OF THE INVENTION

The present invention relates generally to front suspension fork assemblies for bicycles and motorcycles. Specifically, the present invention provides an improved suspension fork for use with bicycles, and optionally with motorcycles, with this improved suspension fork comprising an adjustable compression system for quick and easy adaptation to various types of terrain.

BACKGROUND OF THE INVENTION

The present invention has particular application to bicycles referred to as mountain bikes or trail bikes (and optionally to motorcycles commonly referred to as dirt bikes) which are typically ridden over rough terrain and/or on steep uphill or downhill slopes. Although the description of the invention herein will be directed to bicycles, application of the invention to motorcycles is also known.

As is typical for all conventional bicycles, the front wheel is the steering wheel, that is, it controls the steering of the bicycle. The conventional apparatus used to perform this steering is as follows. First, steering handles, or handlebars, are interconnected to the wheel through a fork. The fork typically has parallel legs that extend upward from each side of the wheel axle and connect at the top of the wheel to a central steering tube which is, in turn, attached to the handlebars. The central steering tube is rotatably mounted to the frame of the bicycle in a manner that supports the frame on the wheel=s axle while permitting rotation of the central steering tube and thus allowing the front wheel to turn relative to the frame of the bicycle.

Additionally, it is conventional in the bicycle industry to use "quick-release" mounting devices or hubs for attaching the front wheel to the end piece of each leg of the bicycle front fork. Such end pieces are commonly referred to as dropouts. The use of these quick-release mounts is commonly used in bicycles because they facilitate removal of the wheel for repair, transport, storage, anti-theft, etc. In certain embodiments, these dropouts may also comprise mounts for attaching a conventional disc brake assembly.

Further, of particular concern to the "off-road" bicycle rider is the jolting of the front wheel as disturbances in the ground surface, such as rocks, holes, or vertical drops, are encountered. This jolting is transferred to the rider through the wheel, fork, steering tube, steering handles, and ultimately the rider=s arms. In addition to the potential discomfort to the rider, there is the added concern for safety. That is, the steering handles become difficult to control at the instant of a severe jolt being experienced by the rider through the handles.

To overcome this problem of severe jolting, designers of trail and mountain bikes have developed front wheel, shock absorbing suspension systems. These shock absorbing systems have fork legs that include stanchion tube(s) (or inner sliding tube(s)) which is connected to a fork crown for attachment to the steering assembly and thus the bicycle frame, and which is(are) slidable within rigid sleeve(s) (or outer tube(s)), while maintaining a lateral seal to prevent any liquid from leaking from the chamber within the suspension fork. In addition, these suspension forks comprise biasing member(s) which operate pneumatically, hydraulically, elastomerically or with metallic coil springs, positioned within the stanchion tube(s) and rigid sleeve(s) to achieve the "shock-absorbing" suspension action. Typically, the biasing member(s) are firmly secured to the top end of the stanchion tube(s) and the bottom end of the rigid sleeve(s).

As obstacles are encountered by the front wheel, the stanchion tube(s) slide within the rigid sleeve(s) as the biasing member(s) compress, thereby absorbing the severe jolt. Optionally, the stanchion tube(s) may be slightly tapered and may have a slight degree of rotatability within the rigid sleeve(s). Moreover, for optimal performance, the fork legs should be aligned such that when an obstacle is encountered directly the resulting upward force(s) should be in substantially the same axis as is the fork legs, such that the slidable stanchion tubes, if more than one, are displaced uniformly.

However, during cornering or other maneuvering, the forces are not in the same axis as the suspension such that torsional and lateral stresses are created, and typically one of the rods is compressed or displaced into the corresponding sleeve more so than the opposite rod. Because the slidable rod has a slight degree of rotatability within the sleeve, high stresses are created at the dropout-to-axle connection when lateral and torsional forces are applied to the wheel in contact with the ground, such as in cornering. Further, while braking in order to stop or corner, outward forces from the brakes create a large amount of torsion on the rigid sleeve(s). The resistance to this torsion is mainly provided by the wheel axle and the brake arch, if any. Thus, increased rigidity and strength are highly desired throughout the front fork, especially at the wheel axle, brake arch and/or crown regions.

One new design to increase the strength and rigidity at the wheel axle comprises an enlarged wheel hub and axle (the axle being approximately 20 mm in diameter) combined with a quick release fastening system. With a front fork suspension system the stresses are much higher than in rigid forks and therefore require increased strength and stability throughout. While uniform compressions relieve stress on the wheel, fork, steering tube, and steering handle, unbalanced compressions, such as from cornering and maneuvering, the stresses on the wheel axle remain high. Therefore, increased rigidity and strength in the wheel axle is highly desirable for off-road bicycles and motorcycles, particularly those with front suspensions. Such a novel design in discussed in co-pending application serial no. 09/189,448, which is herein incorporated by reference.

An additional concern for bicycle riders is the weight of the bicycle. A lighter bicycle is more desirable because it takes less exertion on the part of the rider to power and maneuver. As such, manufacturers of high-end performance bicycles and bicycle components are continuously upgrading their bicycles and components to decrease the overall weight of the bicycle. This has typically been accomplished in at least three ways. One is to use lighter materials such as aluminum alloys and carbon-graphite components. Another is to decrease the overall number of components that comprise a bicycle. Yet another is to decrease the thickness of the components used without sacrificing their strength.

Consequently, separate components could be combined at the front fork suspension system of the bicycle. A typical front fork suspension system includes a crown which allows attachment of the central steering tube and a pair of parallel rigid rods which are slidable in a corresponding pair of rigid sleeves. Typically, the crown has a slit on each of the outer ends which receive the parallel rigid rods and a screw or other threaded fastening device (or pair of screws or threaded fastening devices) is (are) used to tighten the opening by being received on the inner portions of the crown. The dropouts are attached or manufactured at the lower portion of the rigid sleeves. A brake arch is mounted on the lower portion of the rigid rods, typically via screws or other threaded fastening devices, one on each rod, and the brake arch has receptacles for mounting brake calipers.

An alternative design, known as an upside down (or inverted) fork, comprises rigid sleeve(s) (or outer tube(s)) attached to the crown, or mad as a part of the crown, in which corresponding stanchion tube(s) (or inner sliding tube(s)) slide. Accordingly, the dropout(s) is(are) attached or manufactured at the lower portion of the stanchion tube(s), while the brake arch, if any, is mounted on the upper portion of the stanchion tube(s). On conventional inverted fork designs, the crown is typically mounted to the rigid sleeves in the same fashion as it is mounted to the stanchion tube(s) in the non-inverted fork designs.

Recent trends show an increased use of disc brakes on motorcycles and bicycles due to their increased performance and high durability. Typical disc brake systems are mounted on one of the dropouts at the wheel axle for maximum performance. Conventionally, the disc brakes comprise a separately mounted caliper containing the brake pads which, when in the closed position (i.e., pressed together), provide a high degree of frictional force to slow the wheel to a stop. It is therefore appreciated that the present invention can be used with bicycles or motorcycles having either a conventional brake arch design or a conventional disc brake system.

With the increased popularity of mountain biking, and the desire to attack a variety of terrains with a single bike, there has and continues to be a strong desire and need for better suspension forks which have adaptable or adjustable compression. There is especially the need for such adjustability to have the simplicity needed by the casual rider while providing the stability and precision required by the professional rider. As will be shown in greater detail in the drawings and description below, the adjustable compression suspension fork of the present invention provides just that.

SUMMARY OF THE INVENTION

The present invention relates generally to front suspension fork assemblies for bicycles, and more specifically, the present invention provides an improved suspension fork comprising an adjustable compression system for quick and easy adaptation to various types of terrain. The front suspension fork of the present invention comprises a pair of parallel fork legs rigidly attached to each other by either a crown (at their upper end) or a brake arch or both, with each fork leg having at its bottom end a dropout for connection to the axle of a wheel. Also, each fork leg comprises a shock absorber system positioned within slidably engaged inner and outer sliding tubes. The shock absorber system of the present invention comprises a helical coil spring to urge expansion of the sliding tubes, and damping fluid within the cavities of the sliding tubes, so that when the front suspension fork is compressed or expanded, the movement is dampened by the flow of the liquid throughout the internal cavities of the sliding tubes. Specifically, the restrictions on the flow of the damping fluid created by the combination of the flow dampers, bell, and the openings in the barrel dampen the response of the sliding tubes and ultimately the shock absorber to changes in the ground surface thereby improving the ride quality.

Importantly, each flow damper is fitted with a shim made of a flexible material (i.e., plastic, metal, etc.) which during compression or expansion will "flex" to increase the openings in the flow dampers, thereby increasing the flow of damping fluid therethrough. Varying the flexibility of the shims (e.g., by using different material, by altering the thickness of the shims, etc.) will consequently vary the damping effect of the flow dampers (i.e., the shims will require greater or less force in order for them to "flex" open during compression or expansion).

Also, the upper flow damper also has an alternative path for flow of the damping fluid (i.e., though its center) whose opening is adjustable. The shock absorber contains a shaft and plug assembly positioned within the center of the piston, with a screw protruding from the top of the shock absorber for simple adjustment. By rotating the screw, the damping effect of the shock absorber during compression or expansion can be adjusted to be greater or less, depending on the type of response desired by the user (usually depending on the terrain the user intends to ride).

It is therefore an object of the present invention to enhance the performance of a front suspension fork assembly by providing greater flexibility in the adjustment of its damping effect. Another object of the invention is to provide greater precision in "tuning" a front suspension fork to have the desired damping response while also maintaining simple and efficient adjustability. These and other advantages of the present invention will become more thoroughly apparent through the following description of the preferred embodiments and the accompanying drawings.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings is not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention. As discussed above, the present invention relates generally to bicycles, and more particularly to bicycle suspension forks. Specifically, the present invention provides a novel adjustable compression system for such bicycle suspension forks for the forks of a bicycle or motorcycle. Reference is herein made to the figures, wherein the numerals representing particular parts are consistently used throughout the figures and accompanying discussion.

Figure 1:
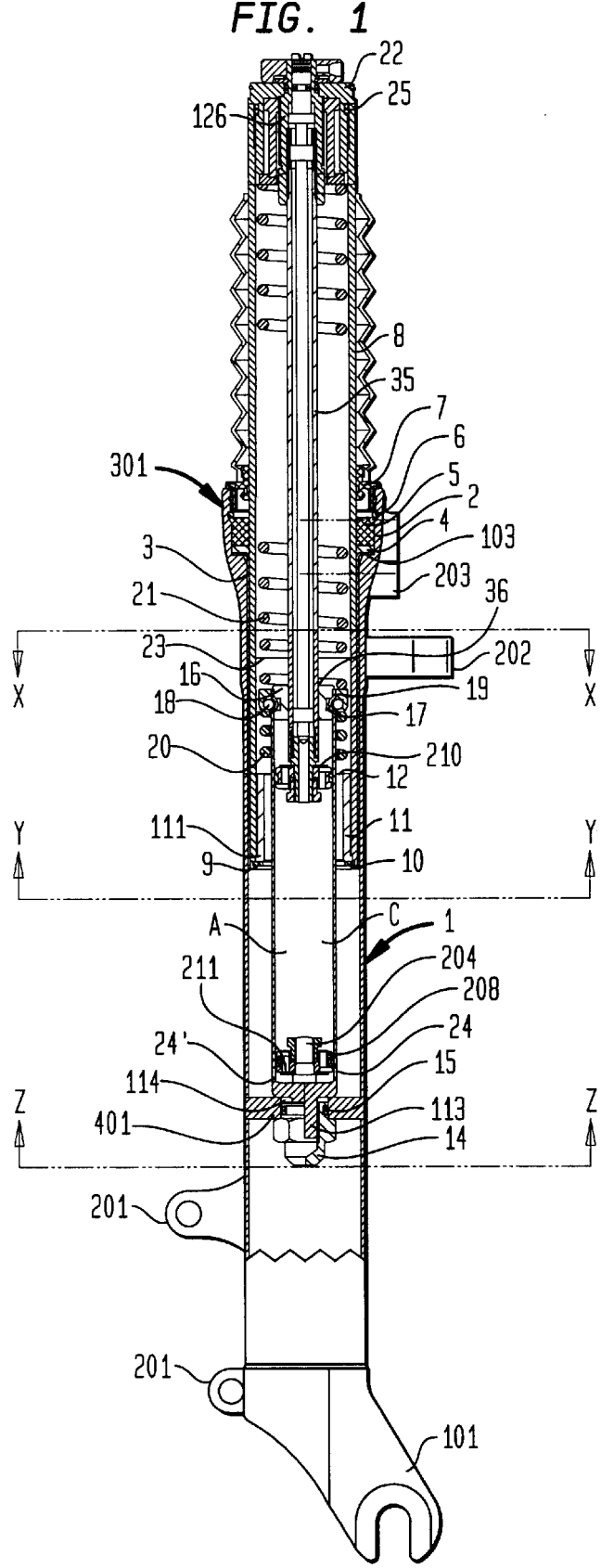
FIG. 1 illustrates a longitudinal cross-section view of a shock absorber according to a preferred embodiment of the present invention.
Figure 4:
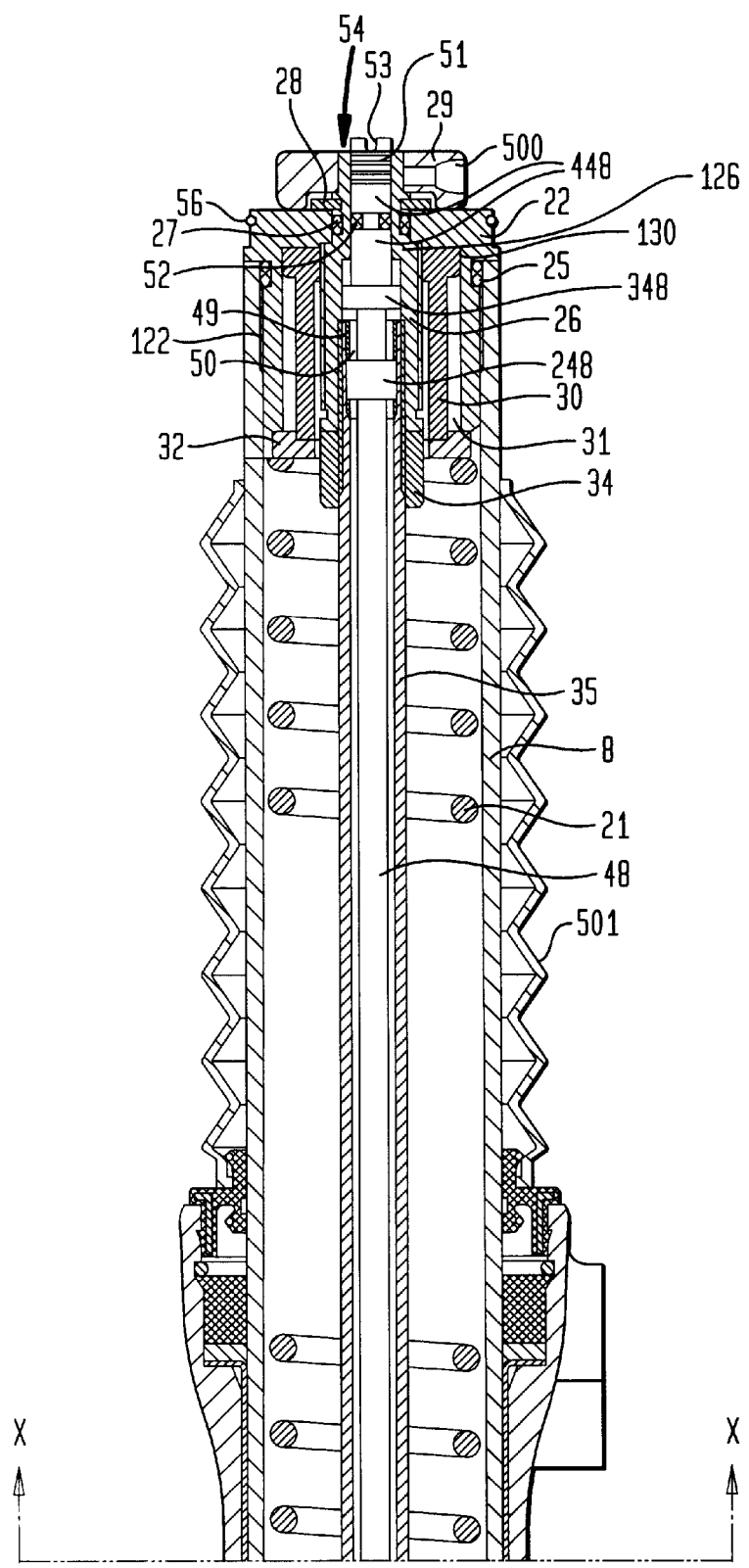
FIG. 4 illustrates an enlarged view of the shock absorber of FIG. 1 above line X—X, which is a longitudinal cross-section view of the upper portion of the shock absorber according to the present invention.

With reference first to FIGS. 1 and 4, outer sliding tube 1 of the shock absorber, for the formation of a stem of a fork for mountain-bike, is equipped in the lower part with a fork appendix 101, for the fastening to the axis of the front wheel of the bike and is possibly equipped with additional appendices 201 for the support of a disc brake caliper, 202 for the brake pad brace, and 203 for the brake arch brace. The outer sliding tube 1 in the upper part ends with an extended portion 301 with a seat 2 having a diameter greater than that of the internal cavity of the outer sliding tube itself and on the bottom of such seat rests the annular neck 103 of a thin bushing 3 made of "Teflon" (registered trademark)or of other suitable material with a low frictional coefficient and highly wearproof, which covers the cavity of the outer sliding tube for an adequate length (see further on). On the neck 103 of said bushing is positioned a washer 4 of suitable material, surmounted by a sealing ring 5 which is blocked in seat 2 by means of a snap ring 6. Seat 2 is then pre-set to restrain a closing ring 7 with internal parts having the function of dust scraper.

In the cavity of the outer sliding tube 1 there is mounted axially sliding and with lateral seal, through the above mentioned bushing 3, the round section inner sliding tube 8, which by its upper end is fastened to the non illustrated cross-bar, integral with the inner sliding tube of a telescopic system equal and parallel to the one in question and which carries the steering axis. The outer surface of the inner sliding tube is covered with an accordion like sheath 501. The lower end of the inner sliding tube 8 is internally equipped with an annular recess 9 (see also FIGS. 2A & 2B) in which stays and is axially blocked with the snap ring 10, the annular neck 111 of a bell 11, open in the upper part and traversed with the clearance indicated with 12, by a round section small cylindrical tube or barrel 13, made with a suitable light alloy and provided in-one piece, on the bottom, with a threaded axial shank 113 screwed in a cap nut 14 which in turn is equipped with a truing threaded axial shank 114 which engages with precision and with lateral seal, through the gasket 15, a hole obtained at the center of the raised base 401 of the outer sliding tube. The outer sliding tube 1 is open at the lower end to allow access to the said base and to the nut 14. The barrel 13 is closed in the upper part by a plug 16 laterally equipped with an annular recess in which a corresponding lateral portion of the same barrel is headed, as indicated with 17. In such annular recess 17 is set an open snap ring 18, on which a cap 19 is rested in the upper part and rimmed in the lower part. Against the lower end of such cap rests the end of a helical spring 20 which with the other and rests against the top of the lower bell 11 of the inner sliding tube 8 when this is in the position of maximum expansion as seen from FIG. 1. The spring 20 is preferably made with a square or rectangular section. On the upper end of the cap 19 rests at least one helical counter-acting spring 21 which concerns the inner sliding tube 8 for its entire length and which is held in this by a plug 22 equipped with means for preloading this spring whose function is to urge the inner sliding tube in expansion and to absorb the compression stress to which the telescopic system in question is subjected by the roughness of the ground.

Figure 3:
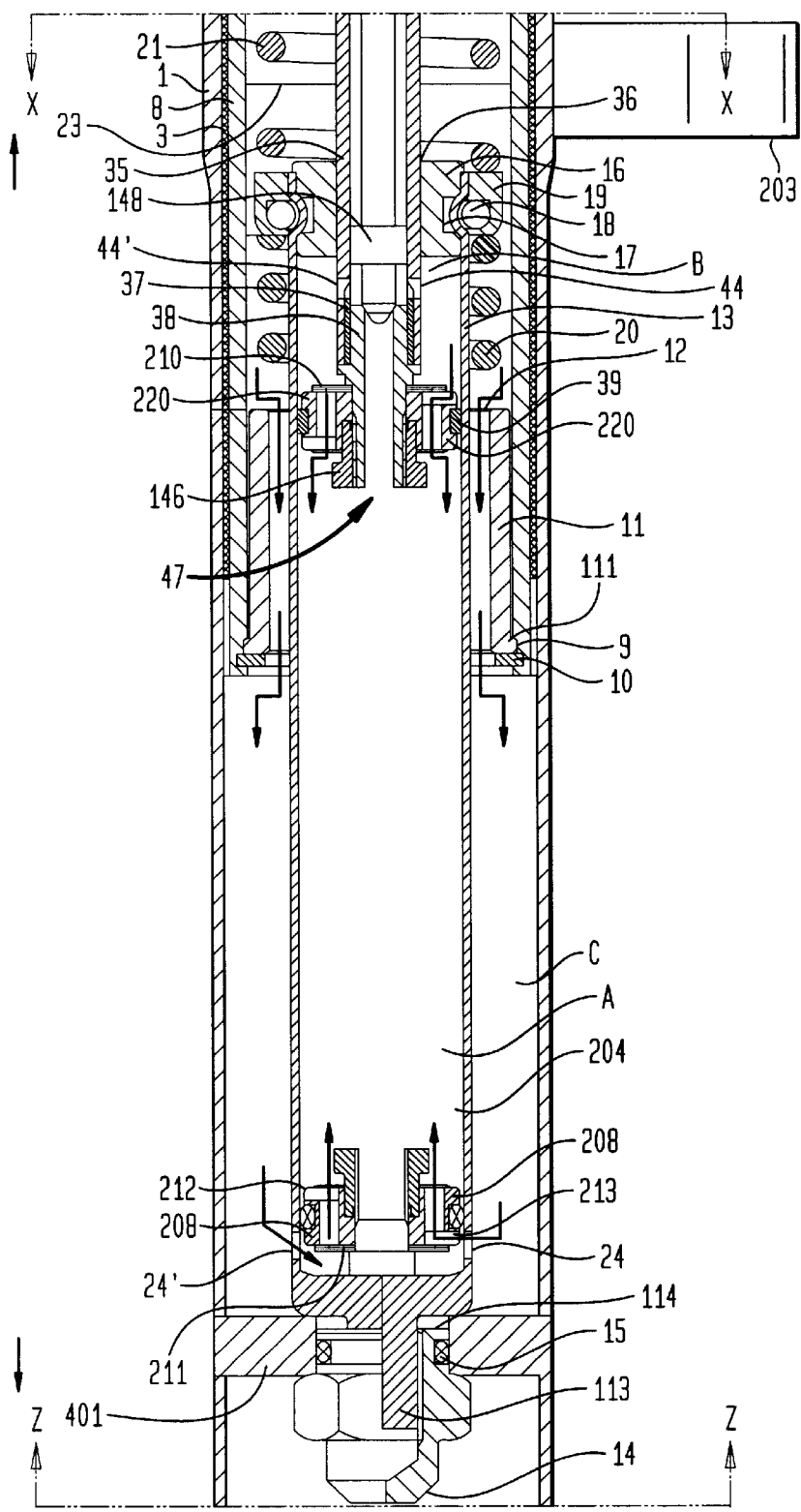
FIG. 3 illustrates an enlarged view of the section from line X—X to line Z—Z of FIG. 1, which is a longitudinal cross-section view of the shock absorber according to the present invention, indicating the flow direction of the damping fluid during the expansion phase.

The bushing 3 placed between the outer sliding tube 1 and the inner sliding tube 8, is of such length as to guide the inner sliding tube itself, but not such as to protrude in the lower part from it when the inner sliding tube itself is in the position of maximum expansion, as shown in FIG. 3. This solution enables one to considerably limit the thickness of the bushing 3 with economical and functional advantages and ensures that such bushing is always correctly held between the parts whose sliding and lateral seal it controls.

Before mounting the plug 22, which with its own externally threaded shank 122 is screwed in a corresponding internally threaded portion of the upper end of the inner sliding tube 8, in the inner sliding tube 8 itself there is introduced a correct amount of a suitable liquid which preferably reaches the level 23, crossing the clearance existing between the cap itself and the internal lateral surface of the inner sliding tube 8, for example up to the line of the level indicated with 23 in FIG. 1 and such fluid completely fills the free chamber C of the outer sliding tube 1 and completely fills the barrel 13 in which it can flow through at least two lower holes 24 and 24' of suitable section. The lower end of the barrel 13 is affixed with a base 204 which is the maximum point of extension of the piston. The base is affixed with a flow damper 208, and a corresponding shim 211, which slides about the cylindrical protrusion of the base 204. A flow damper clip 205 is attached above the flow damper 208 upon the cylindrical portion of the base 204. The flow damper clip 205 has a protrusion at the top to hold a coil spring damper 206 between the top of the flow damper clip 205, and the top of the base flow damper 208.

Figure 2A:
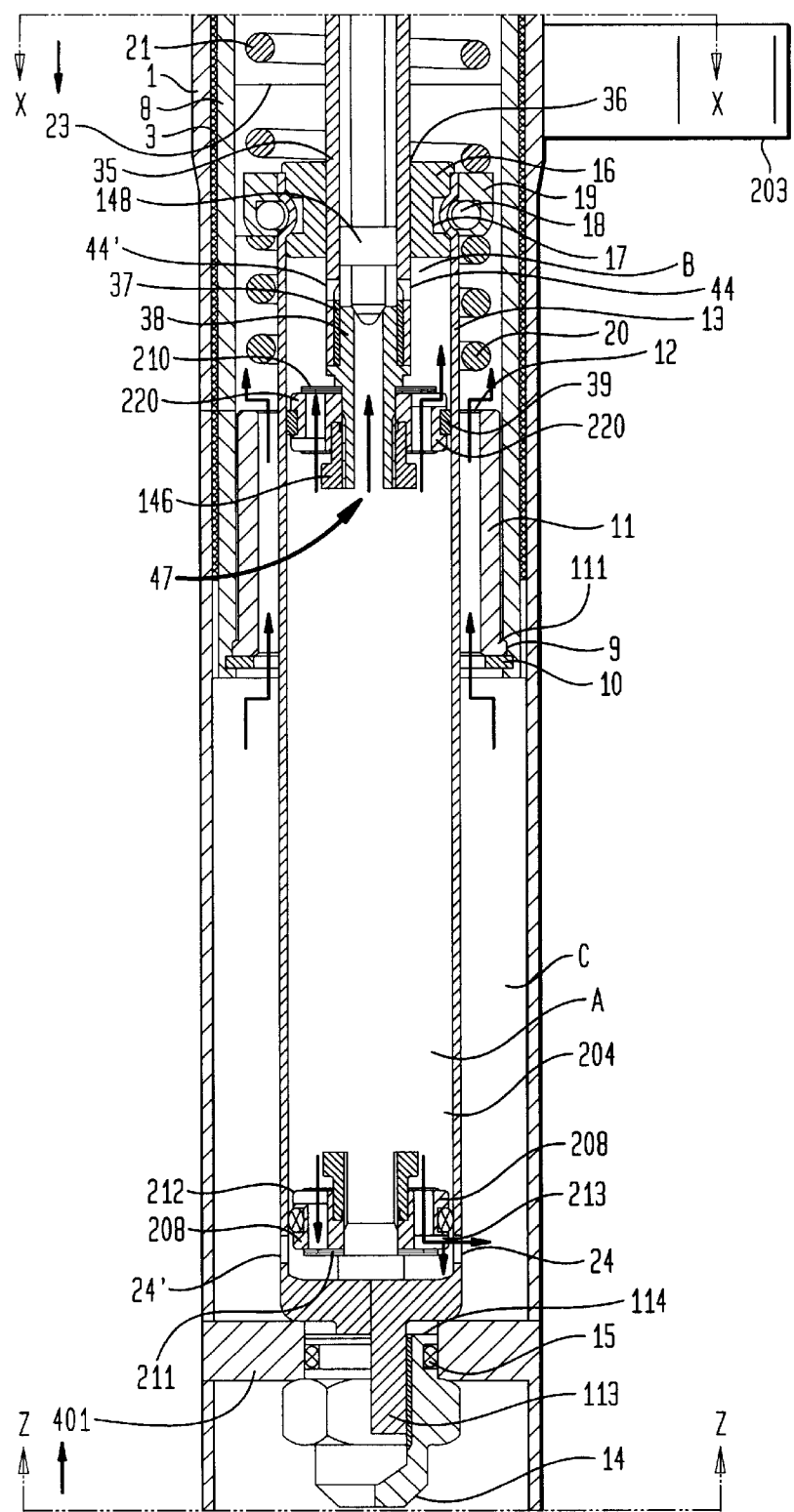
FIG. 2A illustrates an enlarged view of the section from line X—X to line Z—Z of FIG. 1, which is a longitudinal cross-section view of the shock absorber according to the present invention, indicating the flow direction of the damping fluid during the compression phase when the compression force is low.
Figure 2B:
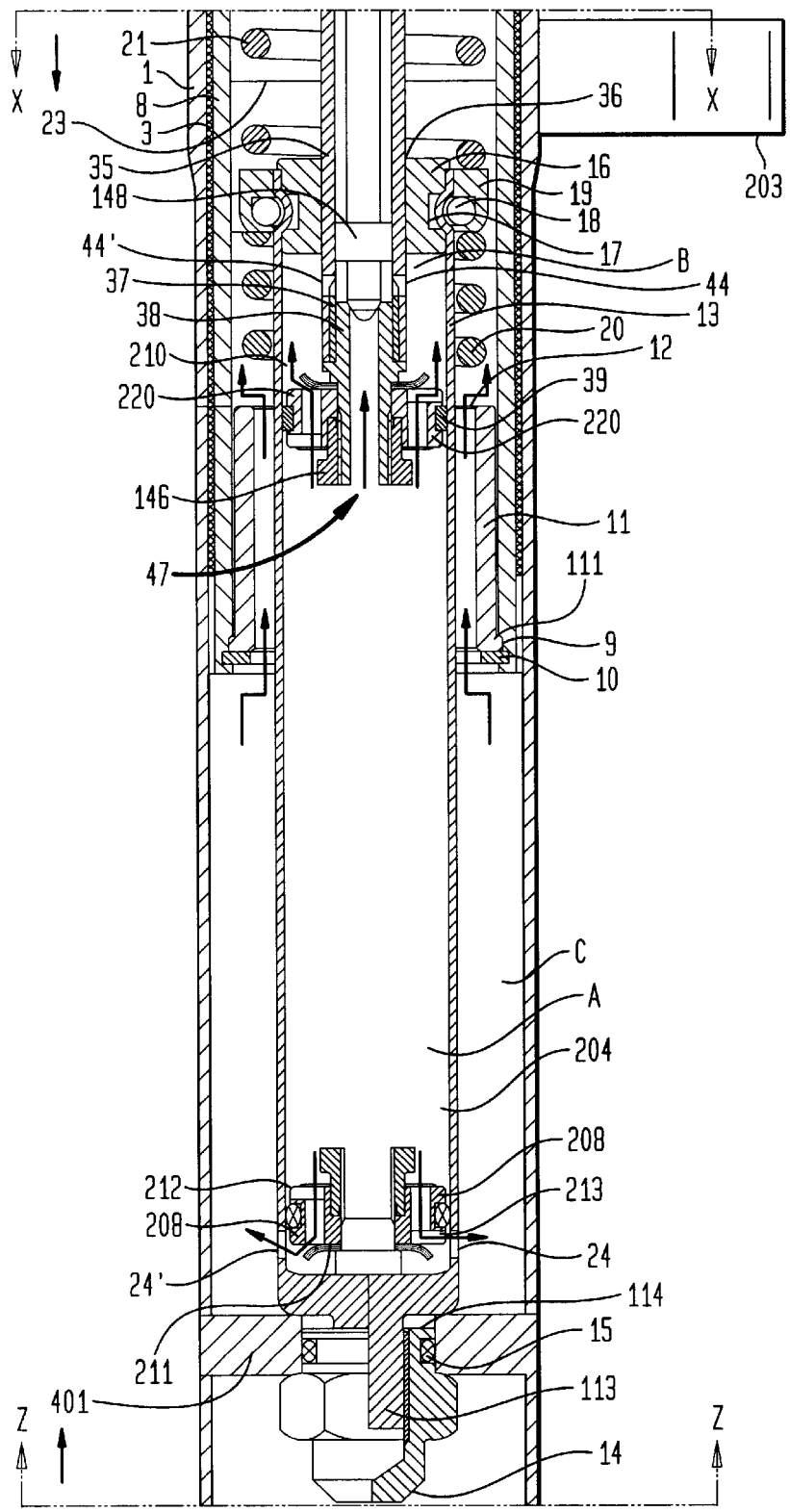
FIG. 2B illustrates an enlarged view of the section from line X—X to line Z—Z of FIG. 1, which is a longitudinal cross-section view of the shock absorber according to the present invention, indicating the flow direction of the damping fluid during the compression phase when the compression force is high.

In the compression phase of the shock absorber, as seen in FIGS. 2A & 2B, liquid contained in area A of the barrel passes into the base flow damper 208 via opening 212. The liquid then passes out of the base flow damper 208, into the free space of barrel 13 below the base flow damper 208 through two pathways. When the compression force is low (see FIG. 2A), fluid passing through the flow damper 208 into the free space therebelow is then forced by the shim 211 to only pass through a limited portion of opening 213. Alternatively, when the compression force is high (see FIG. 2B), shim 211 will flex open thereby increasing the area of opening 213 and consequently increasing the flow of fluid from Chamber A into Chamber C through openings 24 and 24' at the base of the flow damper 208. Thus, increased or improved dampening of the force which is obtained, thereby producing a smoother ride.

In addition, the response of the strut to compression can therefore be varied by changing shims 210 & 211. That is, by varying the thickness of shims 210 and/or 211, or by using materials having increased or decreased flexibility for shims 210 and/or 211 enable the use to alter the dampening effect of the shock absorber of the invention. For example, users who seek less dampening effect (or a more rigid ride—for rougher terrain) in strut 1 would require thicker shims 210 and/or 211 or use a shim 210 and/or 211 with a lower flexibility thereby requiring a more severe compression for the shim 211 to be activated. Conversely, users desiring enhanced dampening (or a more flexible absorber—for smoother terrain) would require thinner shims 210 and/or 211 or use a shim 210 and/or 211 having greater flexibility. After the fluid flows through the base flow damper, it enters the free space of barrel 13 below base flow damper 208 and flows to area C through openings 24 and 24'.

Turning next to FIG. 4, plug 22 is equipped with a gasket 25 for the seal connection on the inner sliding tube and is axially drilled for the passage of the upper tapered section 126, with lateral seal 27, of a screw 26 which is axially held in place by a snap ring 28 and which can be actuated through an external knob 29. On screw 26 is screwed a nut screw 30 externally equipped with teeth 130 which bind some corresponding longitudinal recesses 31 of the lateral surface of the axial cavity of the plug in which lodges the said screw 26—nut screw 30 group. On the lower end of the nut screw 30 rests with the interpositioning of a truing cap 32, the upper end of the counter-acting spring 21. By acting on the knob 29, it will be possible to rotate the screw 26 and determine the ensuing axial shifting of the nut screw 30 downward (i.e., towards the bottom of the shock absorber), preloading spring 21 to the desired point. It is understood that a reference marking (not shown) could be included on top of the plug 22 and on the knob 29, to indicate to the user the level of compression of the counter-acting springs of the fork, without the use of special fixtures, thereby allowing the user to modify the preload at will.

Also from FIG. 4 it can be seen that screw 26 is equipped with an axial cavity subdivided in three sections wherein the diameter decreases towards the top. The lower section 33 of screw 26 is internally threaded and in it there is screwed and axially blocked by means of the lock nut 34 the end of tube 35 which extends downward into barrel 13. Tube 35 extends through opening 36 of plug 16 where it terminates with internally threaded end 37 in which is screwed the upper end of piston 38 (shown on FIGS. 2A, 2B & 3). Piston 38 is equipped on its external wall with stopper 146, upper flow damper 220, shim 210 and at least one gasket 39 which cooperates with lateral seal with the internal wall of barrel 13.

Figure 5A:
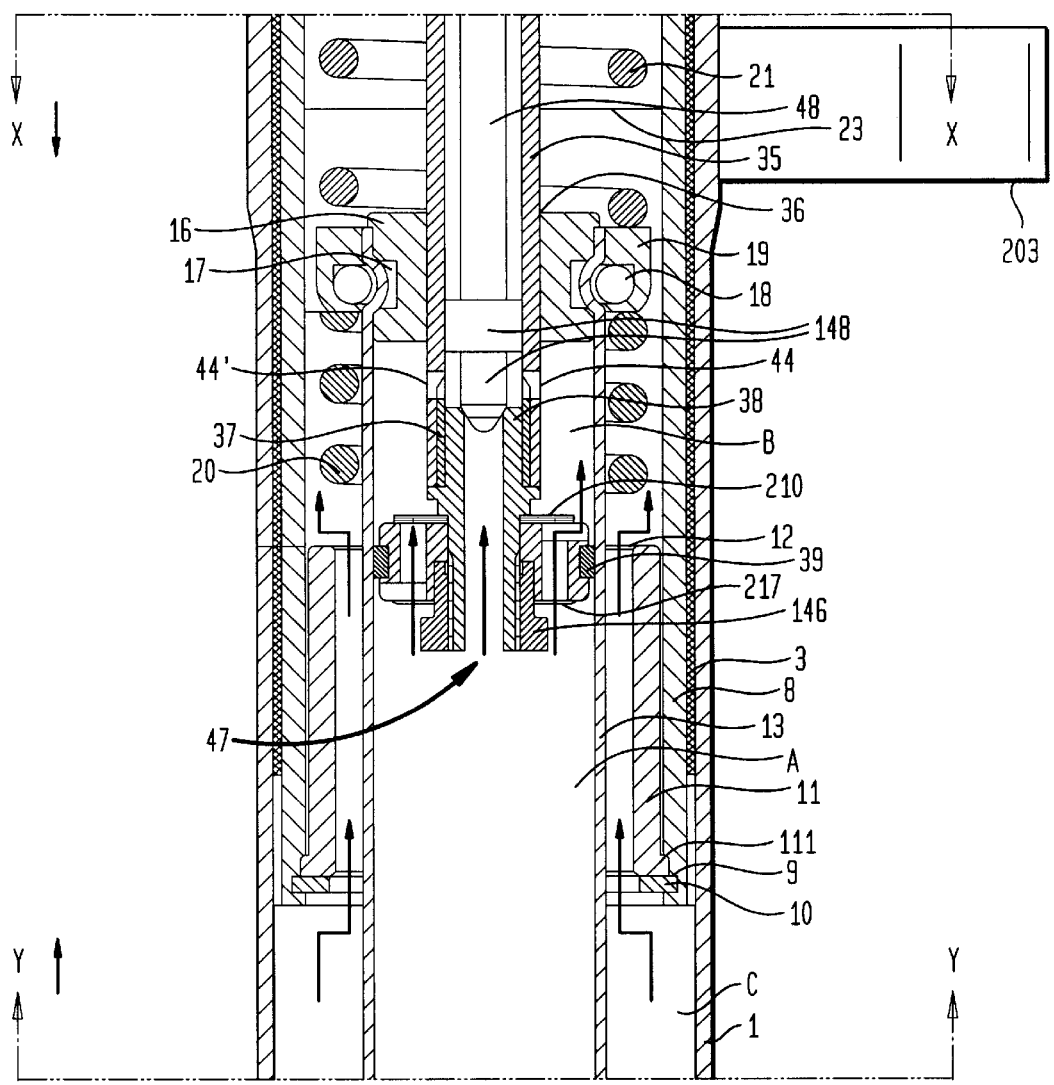
FIG. 5A illustrates an enlarged view of the section from line X—X to line Y—Y of FIG. 1, which is a longitudinal cross-section view of the middle portion of the shock absorber according to the present invention, indicating the flow direction of the damping fluid during the compression phase with the adjustment screw in the closed position.
Figure 5B:
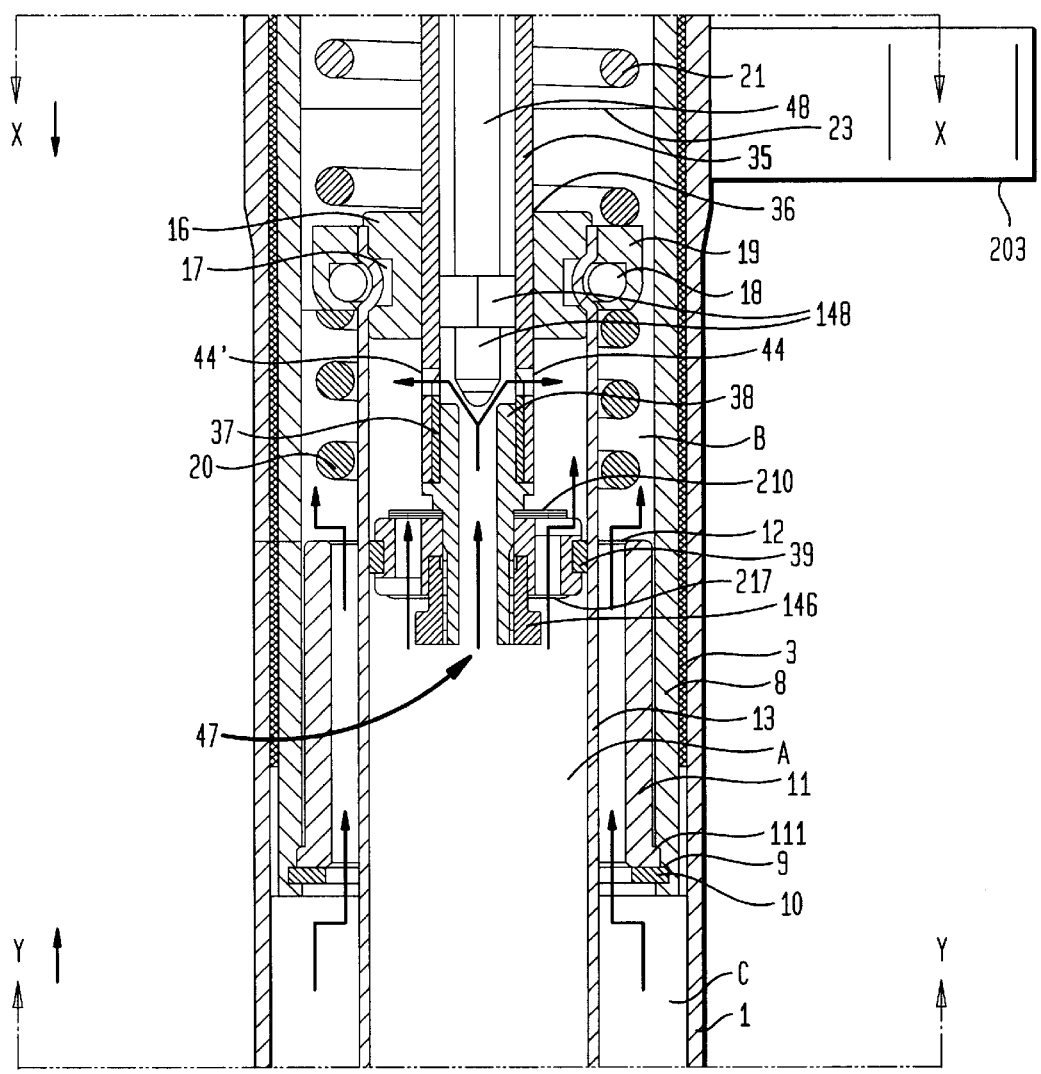
FIG. 5B illustrates an enlarged view of the section from line X—X to line Y—Y of FIG. 1, which is a longitudinal cross-section view of the middle portion of the shock absorber according to the present invention, indicating the flow direction of the damping fluid during the compression phase with the adjustment screw in the open position.

As shown in FIGS. 5A & 5B, at the lower end of tube 35 there are least two openings 44 and 44' (optionally, there may be four or more openings at the lower end of tube 35) and the base of piston 38 is axially provided with a hole 47. In tube 35 there is located a rod 48 which ends in the lower part with a cylindrical/dome shaped head 148 fit to modify resistance to flow through the shunt of the piston 38. For this purpose, the rod 48 is equipped in the upper part with the following means (see FIG. 4): a padded and threaded portion 248 which cooperates with a corresponding internally threaded section 49 of the upper extremity of the tube 35; an upper annular portion 348 which acts as conterboring for the screwing and unscrewing of said rod 48, in the cooperation respectively with the upper end of the tube 35 and with the top of the intermediate section 50 of the axial cavity of the screw 26; and a terminal portion 448 which goes through the upper and lower diameter section of the axial cavity of the screw 26, which is equipped with a lateral seal gasket 52 and which protrudes from the top of the same screw with a section of the right length, equipped with an axial holding snap ring 28 and equipped at the end with diametrical cut 53 to be activated with a screwdriver or other means. By screwing and unscrewing the rod 48 within the limits allowed by the counterboring 348, it is possible to modify the passage port of the hole 47a, up to the complete opening or complete closing of such hole.

In the compression phase of the shock absorber, as illustrated in FIGS. 5A & 5B, liquid contained in barrel 13 within area A passes into the piston flow damper 146 via openings 217, and also through the shunt represented by the hole 47, by the cavity of rod 35. The liquid then passes out of the piston flow damper 146, into the upper area B of barrel 13, via openings 47, 44, and 44'. Possible variations in the rate of flow of this last shunt do not appreciably modify the behavior of the shock absorber. Since chamber A has a volume greater than that of chamber B, the exceeding liquid of the same chamber A flows in chamber C external to the barrel 13, through the lower hole 24 of the barrel 13. Given that in the compression phase, chamber C also decreases in volume, the liquid of this chamber flows through the opening 12 of the bell 11, goes through clearance present between the cap 19 and the internal lateral surface of the inner sliding tube 8 and raises the level 23 of the liquid in the chamber D partially occupied by air, which decreases in volume and is compressed with an elasticity which is added to that of the counter-acting spring 21 (see FIG. 2). The reaction of the strut in the compression phase is effected however by the shim 210 attached to the upper flow damper 220. The effect of the shim has been described in detail above with regards to it action on the lower flow damper. As above when the compression is low to normal, liquid passing from area A through the flow damper 146 into area B is forced by the shim 210 through a limited portion of the opening. Alternatively when the compression is heavy to extreme the shim 210 will flex upward increasing the size of the opening at the top of the flow damper 146, and allowing an increased flow of liquid and therefore dampening the force which is transferred to the user of the strut producing a smoother ride. The response of the strut to compression can therefore be varied with the use of shims 210 (or 211) of different flexibilities. For example a users who seeks a less of a dampening effect in a strut 1 would require a shim 210 with a lower flexibility thereby requiring a more severe compression for the shim 210 to be activated. Alternatively users desiring an increased dampening effect would require a shim of higher flexibility.

The compression phase of the shock absorber can be progressively stopped, by a gradual decrease in the clearance between the cap 19 and the inner sliding tube 8, determined by a correct internal taper of the same inner sliding tube, whereby the internal diameter of this component progressively decreases upwards, as illustrated in FIG. 1.

In the expansion phase of the shock absorber, as illustrated in FIG. 3, the liquid follows an inverse route to that previously considered. In this phase the liquid flows from area B within Barrel 13, into the piston flow damper 146, by way of opening, and into the shunt of the piston flow damper via openings 44 and 44'. In the expansion phase as apposed to the compression phase the shim 210 will not be activated and the size of opening is constant, therefore there is a uniform response of the strut to expansion. Modifying the passage of the hole 46 however, by screwing or unscrewing the rod 48, it will be possible to change at will the level of braking in expansion of the shock absorber. To facilitate the adjustment carried out by means of the rod 48, the upper part 448 of rod 48 has external threading 51 to coact with the internal threading of screw 26 to alter the position of rod 48. Optionally, reference marks 54 could be included on knob 29 to indicate the precise positioning of rod 48 at any given rotational position.

The liquid also flows from area C through openings 24 and 24' into the free space below the base flow damper 208 due to the decreased pressure created by the expansion of the strut. The liquid enters the base flow damper through opening 213. The size of opening 213 is limited by shim 211. The shim 211 is not activated in the expansion phase, and therefore a uniform flow is experienced through the base flow damper 208, into the low pressure area of the barrel, area C.

It is clear that, by unscrewing the screw nut 14 and the plug 22, it is possible to disassemble the shock absorber and all of its components. By removing the snap ring 6 it will be possible to remove and replace the sliding bushing 3 when it is worn out.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the adjustable suspension system of the present invention is capable of being embodied in other forms without departing from its essential characteristics.

What is claimed is:

1. An adjustable shock absorber comprising:
   outer sliding tubes each comprising a closed end and an open end, said closed end for fastening to a wheel axis;
   inner sliding tubes each having an internal cavity and an upper end and a first elastic means positioned within said internal cavity;
   a support tube assembly; and
   an adjustment means comprising:
      at least one adjustable screw;
      a barrel; and
      a piston positioned within said barrel creating an upper and lower chamber, and comprising an upper flow damper and lower flow damper which control the passage of liquid between said upper chamber and said lower chamber each said flow damper including a shim which will flex during compressions to allow greater flow through the respective flow damper, thereby dampening the resultant force on said piston
   wherein said outer and inner sliding tubes make up said shock absorber having at least two of said chambers arranged such that said liquid flows through at least one of said flow dampers;
   wherein said upper flow damper is adjustable by means of an adjustment screw positioned axially within said support tube; and
   wherein said inner sliding tube is slidably engaged within said open end of said outer sliding tube.

2. A shock absorber according to claim 1, wherein said first elastic means comprises a helical coil spring.

3. A shock absorber according to claim 1, wherein said outer sliding tube is equipped with appendices for the support of braking equipment.

4. A shock absorber according to claim 1, wherein said outer sliding tube has at said open end an extended portion with a seat having a greater diameter than the internal cavity of the outer sliding tube.

5. An outer sliding tube according to claim 4, wherein said seat is attached to the annular neck of a bushing.

6. A shock absorber according to claim 1, wherein said inner sliding tube includes a plug assembly at its upper end.

7. A shock absorber according to claim 1, wherein said barrel is fastened at its lower end to said closed end of said outer sliding tube.

8. A shock absorber according to claim 1, wherein said support tube is connected at its upper end to said first plug assembly and on its lower end said support tube is connected to said piston.

9. A shock absorber according to claim 1, wherein said barrel has a plurality of holes to facilitate the flow of fluid.

10. A shock absorber according to claim 1, wherein said barrel is affixed at its lower end with a base which limits the maximum compression of said shock absorber.

11. An adjustable shock absorber comprising:
   an outer sliding tube having a closed end comprising attachment means for fastening to a wheel axis and an open end for telescopically mounting said inner sliding tube;
   an inner sliding tube comprising a first plug assembly at its upper end and a first elastic means positioned within its internal cavity;
   an adjustment means comprising:
      at least one adjustable screw;
      a barrel which is closed on its upper end by a second plug assembly and fastened on its lower end to said closed end of said outer sliding tube; and
      a piston positioned within said barrel creating an upper and lower chamber, and comprising a upper flow damper and lower flow damper which control the passage of liquid between said upper chamber and said lower chamber each said flow damper including a shim on each flow damper which will flex during compressions of variable degree and allow greater flow through the respective flow damper, thereby dampening the resultant force transferred by the shock absorber; and
   a support tube connected on its upper end to said first plug assembly and connected on its lower end to said piston and axially traversing said second plug assembly;
   wherein said telescopic system has at least two internal chambers arranged such that the liquid contained therein flows through at least one of said flow dampers; and wherein said upper flow damper is adjustable by means of an adjustment screw positioned axially within said support tube and which protrudes with lateral seal from said first plug assembly.

12. A shock absorber according to claim 11, wherein said first elastic means comprises a helical coil spring.

13. A shock absorber according to claim 11, wherein said outer sliding tube is equipped with appendices for the support of braking equipment.

14. A shock absorber according to claim 11, wherein said outer sliding tube has at said open end an extended portion with a seat having a greater diameter than the internal cavity of the outer sliding tube.

15. An outer sliding tube according to claim 14, wherein said seat is attached to the annular neck of a bushing.

16. A shock absorber according to claim 11, wherein said inner sliding tube includes a plug assembly at its upper end.

17. A shock absorber according to claim 11, wherein said barrel has a plurality of holes to facilitate the flow of fluid.

18. A shock absorber according to claim 11, wherein said barrel is affixed at its lower end with a base which limits the maximum compression of said shock absorber.

* * * * *